US011381298B2

(12) United States Patent
Zhou et al.

(10) Patent No.: US 11,381,298 B2
(45) Date of Patent: Jul. 5, 2022

(54) USER EQUIPMENT BASED BEAM MEASUREMENT RESOURCE ACTIVATION

(71) Applicant: QUALCOMM Incorporated, San Diego, CA (US)

(72) Inventors: Yan Zhou, San Diego, CA (US); Mostafa Khoshnevisan, San Diego, CA (US); Tao Luo, San Diego, CA (US); Xiaoxia Zhang, San Diego, CA (US); Hamed Pezeshki, San Diego, CA (US); Konstantinos Dimou, San Francisco, CA (US); Sony Akkarakaran, Poway, CA (US); Seyed Ali Akbar Fakoorian, San Diego, CA (US); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/903,919

(22) Filed: Jun. 17, 2020

(65) Prior Publication Data

US 2020/0412433 A1    Dec. 31, 2020

Related U.S. Application Data

(60) Provisional application No. 62/868,665, filed on Jun. 28, 2019.

(51) Int. Cl.
*H04W 72/04* (2009.01)
*H04B 7/06* (2006.01)
(Continued)

(52) U.S. Cl.
CPC ........ *H04B 7/0695* (2013.01); *H04B 17/336* (2015.01); *H04L 5/0055* (2013.01);
(Continued)

(58) Field of Classification Search
CPC .......... H04W 72/1257; H04W 72/042; H04W 76/28; H04W 76/27; H04W 24/10;
(Continued)

(56) References Cited

U.S. PATENT DOCUMENTS

2016/0353510 A1* 12/2016 Zhang ................... H04L 43/16
2017/0359826 A1* 12/2017 Islam ................. H04W 72/085
(Continued)

OTHER PUBLICATIONS

International Search Report and Written Opinion—PCT/US2020/038329—ISAEPO—dated Sep. 22, 2020.
(Continued)

*Primary Examiner* — Wei Zhao
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment may determine that beam measurement resources, associated with performing beam management, are to be activated, and may transmit an activation signal associated with requesting activation of the beam measurement resources. In some aspects, a base station may receive an activation signal associated with requesting activation of beam measurement resources associated with performing beam management, wherein the activation signal is transmitted by a user equipment, and may activate one or more of the beam management resources based at least in part on the activation signal. Numerous other aspects are provided.

30 Claims, 9 Drawing Sheets

(51) Int. Cl.
    *H04L 5/00*     (2006.01)
    *H04W 72/12*     (2009.01)
    *H04W 76/28*     (2018.01)
    *H04W 24/10*     (2009.01)
    *H04B 17/336*     (2015.01)
    *H04W 76/27*     (2018.01)

(52) U.S. Cl.
    CPC .......... *H04L 5/0098* (2013.01); *H04W 24/10* (2013.01); *H04W 72/042* (2013.01); *H04W 72/1257* (2013.01); *H04W 76/27* (2018.02); *H04W 76/28* (2018.02)

(58) Field of Classification Search
    CPC ... H04B 7/0695; H04B 17/336; H04L 5/0055; H04L 5/0098
    See application file for complete search history.

(56) References Cited

U.S. PATENT DOCUMENTS

| | | | | |
|---|---|---|---|---|
| 2018/0054245 | A1* | 2/2018 | Trainin | H04B 7/0695 |
| 2019/0007906 | A1* | 1/2019 | Hessler | H04W 16/28 |
| 2019/0044602 | A1* | 2/2019 | Cui | H04B 7/086 |
| 2020/0195324 | A1* | 6/2020 | Grant | H04B 7/0617 |
| 2020/0244337 | A1* | 7/2020 | Yuan | H04W 72/0466 |
| 2020/0245156 | A1* | 7/2020 | Takano | H04B 17/336 |
| 2020/0245173 | A1* | 7/2020 | Kusashima | H04B 7/086 |
| 2021/0111849 | A1* | 4/2021 | Yang | H04L 5/0032 |
| 2021/0218457 | A1* | 7/2021 | Xu | H04W 76/19 |
| 2021/0227408 | A1* | 7/2021 | Takiguchi | H04W 68/005 |

OTHER PUBLICATIONS

LG Electronics: "Discussion on CSI Framework", 3GPP Draft, 3GPP TSG RAN WG1 Meeting #89, R1-1707607 NR_CSI_Framework, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, May 6, 2017 (May 6, 2017), XP051261949, pp. 1-7, Retrieved from the Internet: URL: http://www.3gpp.org/ftp/tsg_ran/WG1_RL1/TSGR1_89/Docs/, [retrieved on May 6, 2017], Paragraph "3 Dynamic Signaling Aspects".

Samsung: "On Beam Indication", 3GPP Draft, 3GPP TSG RAN WG1 NR #90, R1-1713595-DL_Beam_Indication_V1, 3rd Generation Partnership Project (3GPP), Mobile Competence Centre, 650, Route Des Lucioles, F-06921 Sophia-Antipolis Cedex, France, vol. RAN WG1, No. Prague, Czechia, Aug. 21, 2017-Aug. 25, 2017, Aug. 20, 2017 (Aug. 20, 2017), XP051316395, 10 Pages, Retrieved from the Internet: URL: http://www.3gpp.org/ftp/Meetings_3GPP_SYNC/RAN1/Docs/, [retrieved on Aug. 20, 2017], Paragraph "2 Beam Management Configuration and QCL Relations."

* cited by examiner

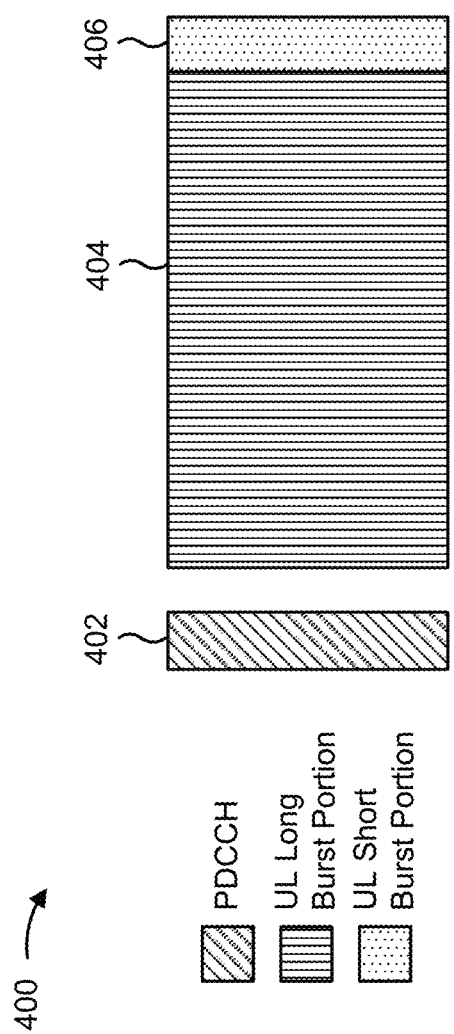

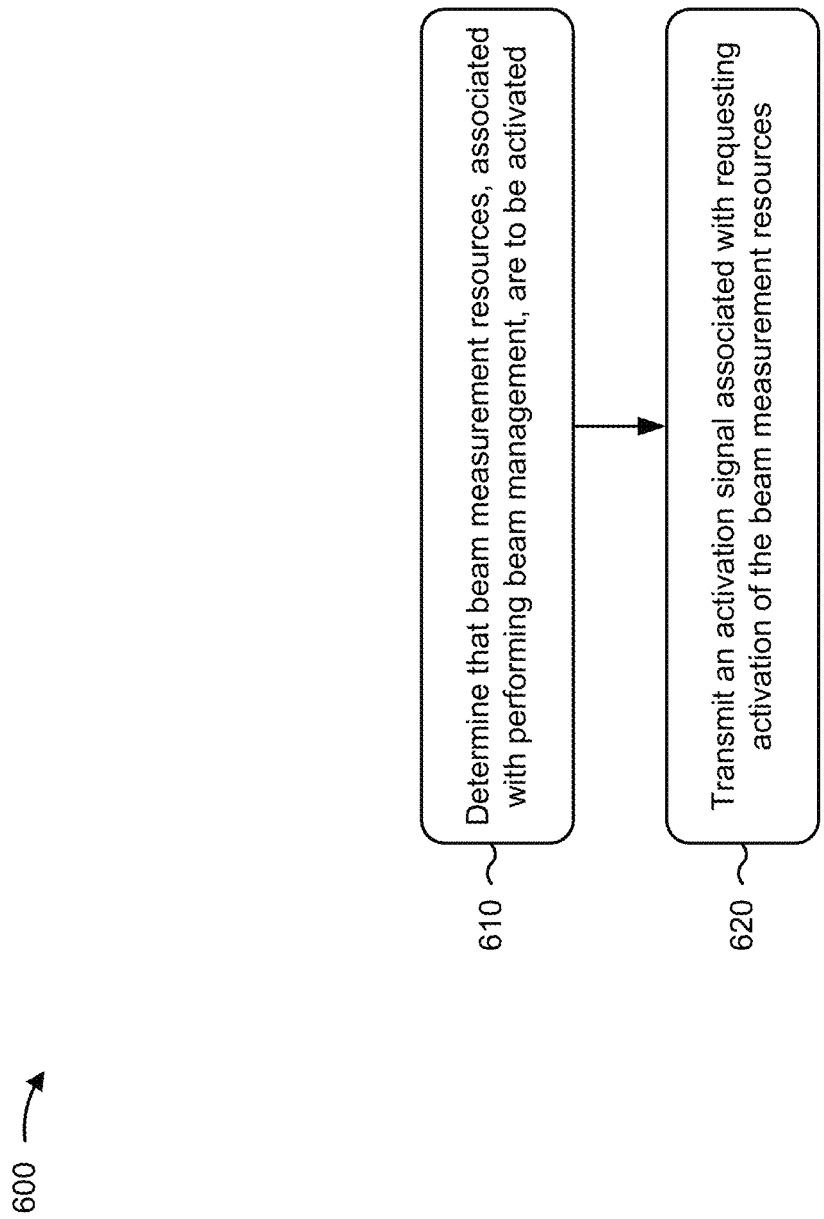

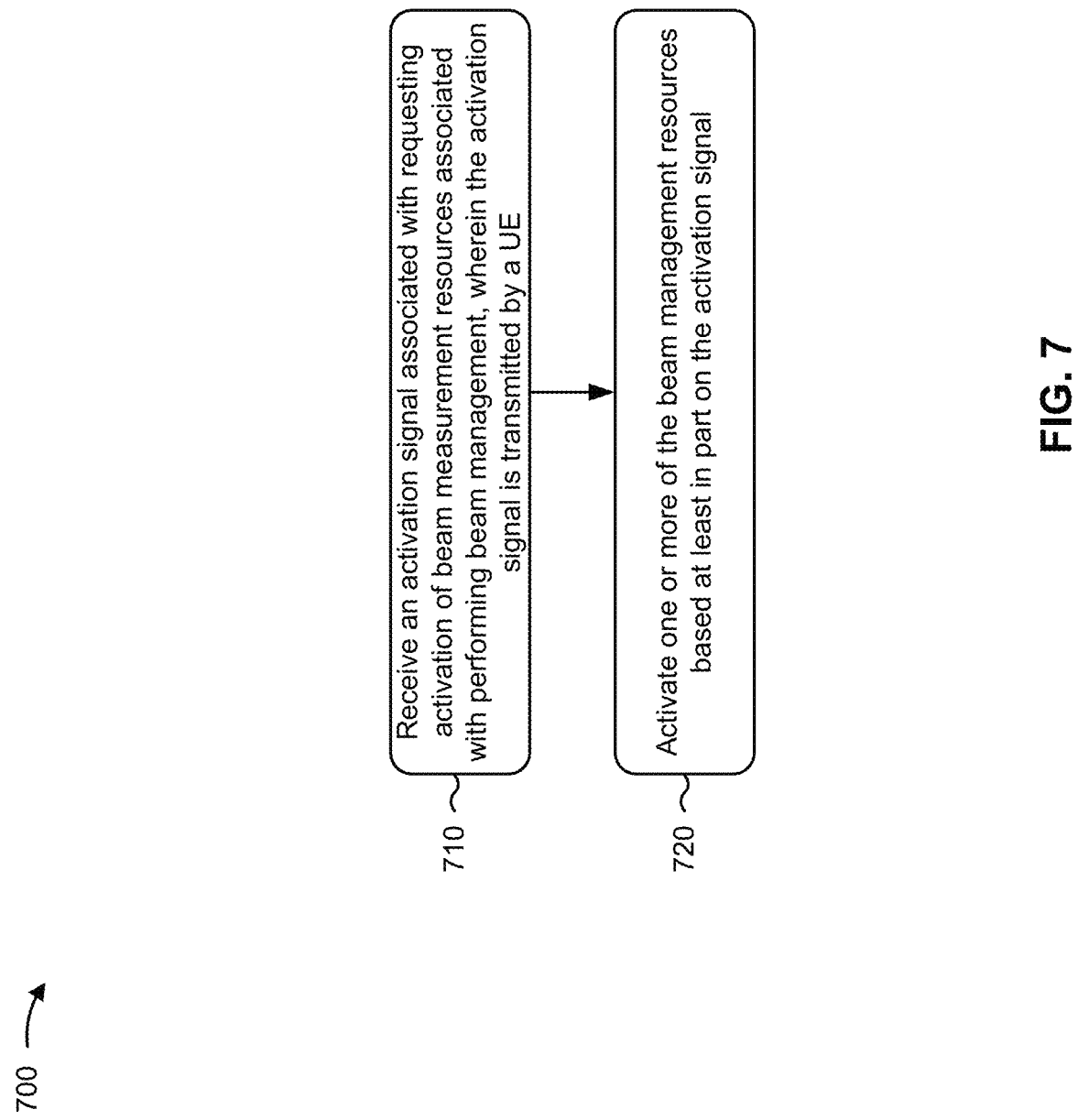

USER EQUIPMENT BASED BEAM MEASUREMENT RESOURCE ACTIVATION

CROSS-REFERENCE TO RELATED APPLICATION

This Patent Application claims priority to U.S. Provisional Patent Application No. 62/868,665, filed on Jun. 28, 2019, entitled "USER EQUIPMENT BASED BEAM ACTIVATION MEASUREMENT RESOURCE ACTIVATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for user equipment (UE) based beam measurement resource activation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include determining that beam measurement resources, associated with performing beam management, are to be activated; and transmitting an activation signal associated with requesting activation of the beam measurement resources.

In some aspects, a UE for wireless communication may include memory and one or more processors operatively coupled to the memory. The memory and the one or more processors may be configured to determine that beam measurement resources, associated with performing beam management, are to be activated; and transmit an activation signal associated with requesting activation of the beam measurement resources.

In some aspects, a non-transitory computer-readable medium may store one or more instructions for wireless communication. The one or more instructions, when executed by one or more processors of a UE, may cause the one or more processors to: determine that beam measurement resources, associated with performing beam management, are to be activated; and transmit an activation signal associated with requesting activation of the beam measurement resources.

In some aspects, an apparatus for wireless communication may include means for determining that beam measurement resources, associated with performing beam management, are to be activated; and means for transmitting an activation signal associated with requesting activation of the beam measurement resources.

In some aspects, a method of wireless communication, performed by a base station, may include receiving an activation signal associated with requesting activation of beam measurement resources associated with performing beam management, wherein the activation signal is transmitted by a UE; and activating one or more of the beam management resources based at least in part on the activation signal.

In some aspects, a base station for wireless communication may include memory and one or more processors operatively coupled to the memory. The memory and the one or more processors may be configured to receive an activation signal associated with requesting activation of beam measurement resources associated with performing beam management, wherein the activation signal is transmitted by a UE; and activate one or more of the beam management resources based at least in part on the activation signal.

In some aspects, a non-transitory computer-readable medium may store one or more instructions for wireless communication. The one or more instructions, when executed by one or more processors of a base station, may cause the one or more processors to: receive an activation signal associated with requesting activation of beam measurement resources associated with performing beam management, wherein the activation signal is transmitted by a UE; and activate one or more of the beam management resources based at least in part on the activation signal.

In some aspects, an apparatus for wireless communication may include means for receiving an activation signal associated with requesting activation of beam measurement resources associated with performing beam management, wherein the activation signal is transmitted by a UE; and means for activating one or more of the beam management resources based at least in part on the activation signal.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of an uplink (UL)-centric slot, in accordance with various aspects of the present disclosure.

FIG. 6 is a diagram illustrating an example process performed, for example, by a user equipment, in accordance with various aspects of the present disclosure.

FIG. 7 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
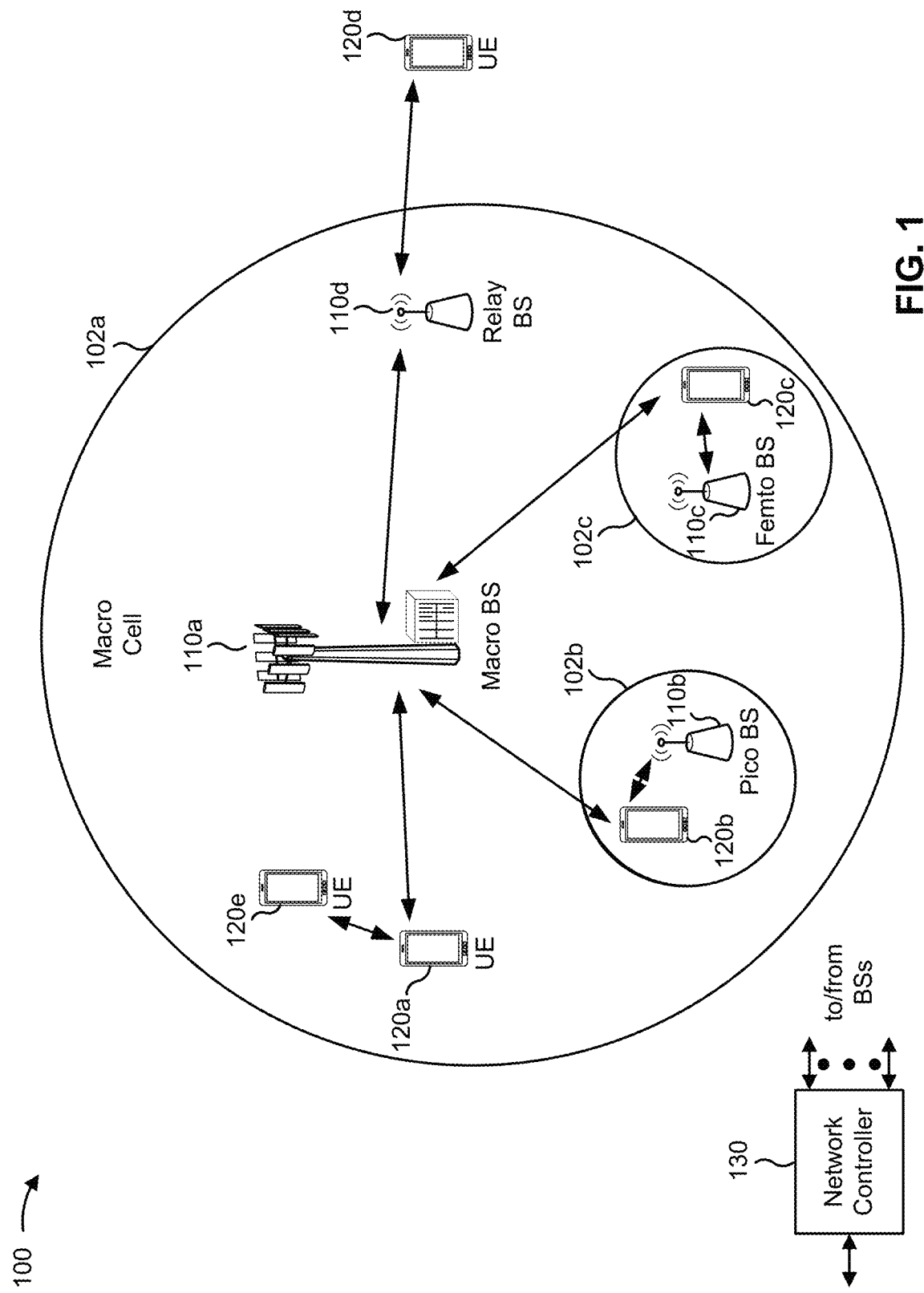
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
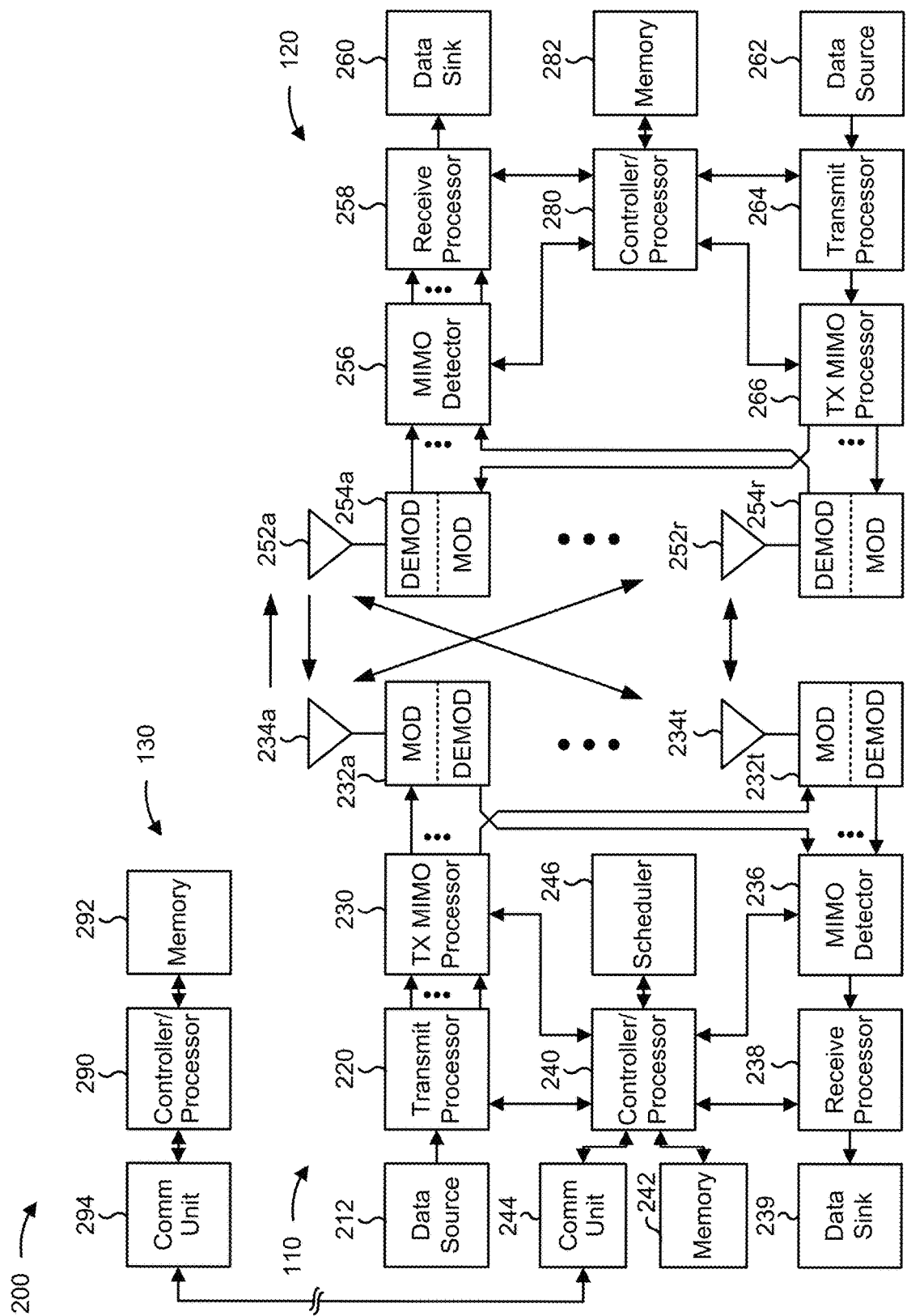
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UE based beam measurement resource activation, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for determining that beam measurement resources, associated with performing beam management, are to be activated (e.g., using receive processor 258, transmit processor 264, controller/processor 280, memory 282, and/or the like); means for transmitting an activation signal associated with requesting activation of the beam measurement resources (e.g., using controller/processor 280, transmit processor 264, TX MIMO processor 266, MOD 254, antenna 252, and/or the like); and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving an activation signal associated with requesting activation of beam measurement resources associated with performing beam management, wherein the activation signal is transmitted by a UE 120 (e.g., using antenna 234, DEMOD 232, MIMO detector 236, receive processor 238, controller/processor 240, and/or the like); means for activating one or more of the beam management resources based at least in part on the activation signal (e.g., using controller/processor 240, transmit processor 220, TX MIMO processor 230, MOD 232, antenna 234, and/or the like); and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
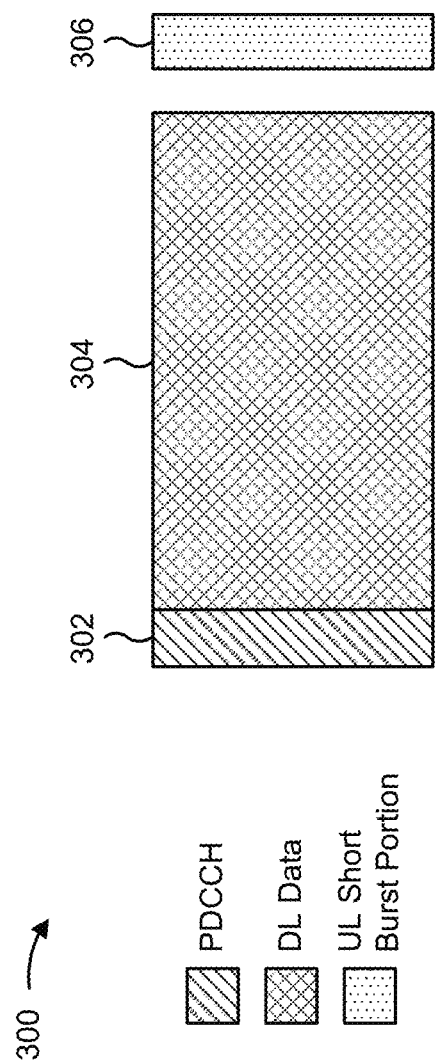
FIG. 3 is a diagram illustrating an example of a downlink (DL)-centric slot, in accordance with various aspects of the present disclosure.

FIG. 3 is a diagram 300 showing an example of a DL-centric slot or wireless communication structure. The DL-centric slot may include a control portion 302. The control portion 302 may exist in the initial or beginning portion of the DL-centric slot. The control portion 302 may include various scheduling information and/or control information corresponding to various portions of the DL-centric slot. In some configurations, the control portion 302 may be a physical DL control channel (PDCCH), as indicated in FIG. 3. In some aspects, the control portion 302 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 304. The DL data portion 304 may sometimes be referred to as the payload of the DL-centric slot. The DL data portion 304 may include the communication resources utilized to communicate DL data from the scheduling entity (e.g., UE or BS) to the subordinate entity (e.g., UE). In some configurations, the DL data portion 304 may be a physical DL shared channel (PD SCH).

The DL-centric slot may also include an UL short burst portion 306. The UL short burst portion 306 may sometimes be referred to as an UL burst, an UL burst portion, a common UL burst, a short burst, an UL short burst, a common UL short burst, a common UL short burst portion, and/or various other suitable terms. In some aspects, the UL short burst portion 306 may include one or more reference signals. Additionally, or alternatively, the UL short burst portion 306 may include feedback information corresponding to various other portions of the DL-centric slot. For example, the UL short burst portion 306 may include feedback information corresponding to the control portion 302 and/or the data portion 304. Non-limiting examples of information that may be included in the UL short burst portion 306 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 306 may include additional or alternative information, such as information pertaining to random access channel (RACH) procedures, scheduling requests, and various other suitable types of information.

As illustrated in FIG. 3, the end of the DL data portion 304 may be separated in time from the beginning of the UL short burst portion 306. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may be used without necessarily deviating from the aspects described herein.

As indicated above, FIG. 3 is provided as an example. Other examples may differ from what is described with regard to FIG. 3.

FIG. 4 is a diagram 400 showing an example of an UL-centric slot or wireless communication structure. The UL-centric slot may include a control portion 402. The control portion 402 may exist in the initial or beginning portion of the UL-centric slot. The control portion 402 in FIG. 4 may be similar to the control portion 302 described above with reference to FIG. 3. The UL-centric slot may also include an UL long burst portion 404. The UL long burst portion 404 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 402 may be a physical DL control channel (PDCCH).

As illustrated in FIG. 4, the end of the control portion 402 may be separated in time from the beginning of the UL long burst portion 404. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 406. The UL short burst portion 406 in FIG. 4 may be similar to the UL short burst portion 306 described above with reference to FIG. 3, and may include any of the information described above in connection with FIG. 3. The foregoing is one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, the term "sidelink signal" may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 4 is provided as an example. Other examples may differ from what is described with regard to FIG. 4.

In a wireless communication system, such as an NR system, a UE performs beam management based on signals received in beam measurement resources. The beam measurement resources can include resources that carry, for example, CSI reference signals (CSI-RSs) on different beams. The UE can measure the CSI-RSs received in these designated beam measurement resources (e.g., by performing reference signal received power (RSRP) measurements), and perform beam management based at least in part on results of these measurements.

Typically, activation of these beam measurement resources is decided and signaled by a base station. For example, a UE may provide a beam report to the base station and, based on the beam report, the base station decides whether to activate the beam measurement resources. If the base station decides to activate the beam measurement resources, then the base station signals the UE that the beam measurement resources have been activated. The UE can then perform beam management using signals measured in the beam measurement resources. However, activation latency in this scenario can be problematic. For example, for traffic that requires high reliability and low latency (e.g., ultra-reliable low-latency communication (URLLC) traffic), the base station based activation and signaling of the beam measurement resources described above may result in an amount of latency and/or reliability that fails to satisfy a requirement of the traffic.

Some aspects described herein provide techniques and apparatuses for UE based beam measurement resource activation. In some aspects, as described in further detail below, a UE may signal to the base station to activate beam measurement resources in association with performing beam management (e.g., before the UE generates a beam report), and the base station may activate the beam measurement resources, accordingly. In this way, latency associated with activating the beam measurement resources is reduced, thereby improving performance associated with, for example, traffic that requires high reliability and low latency (e.g., URLLC traffic).

Figure 5A:
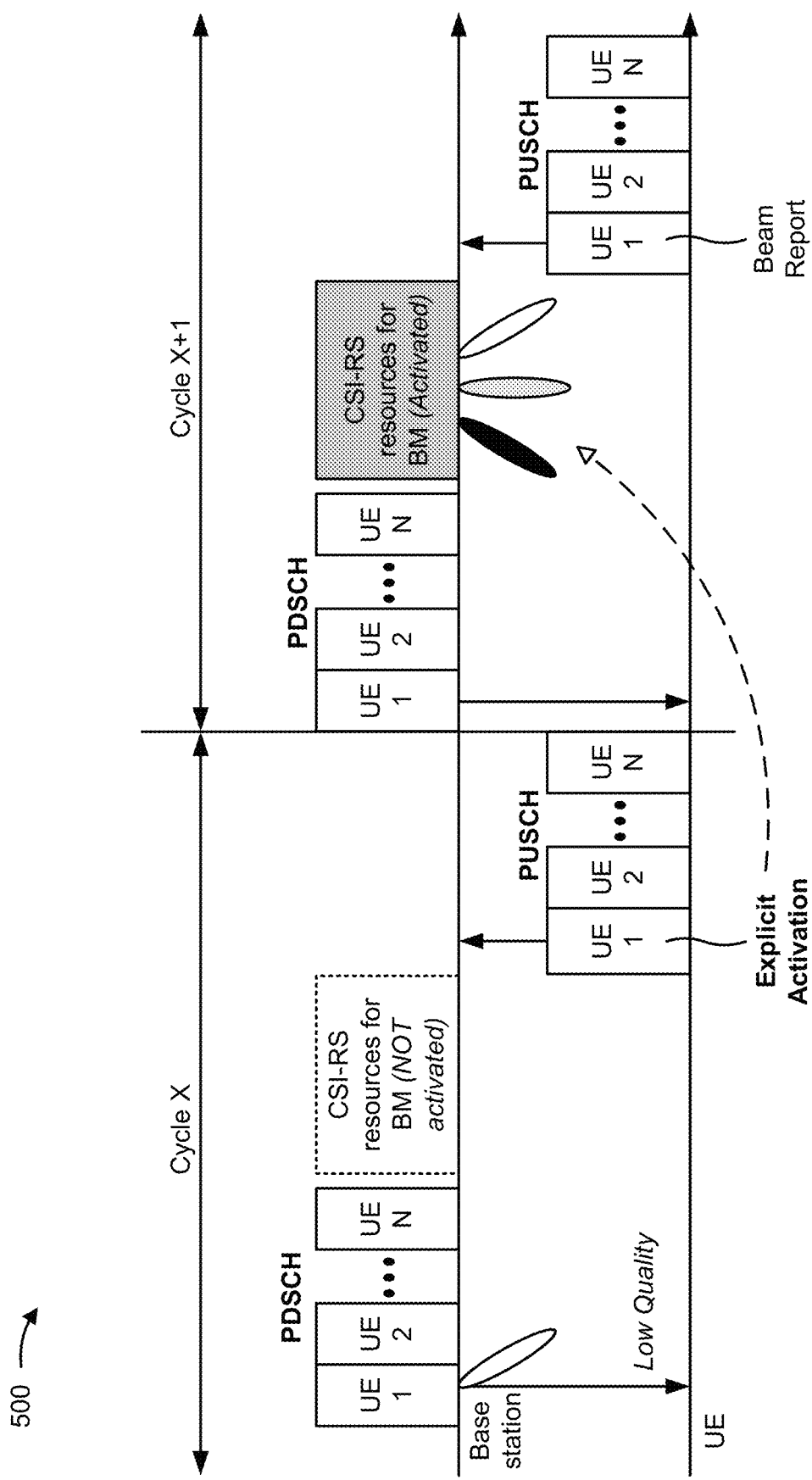
FIGS. 5A-5C are diagrams illustrating examples of UE based beam measurement resource activation, in accordance with various aspects of the present disclosure.
Figure 5B:
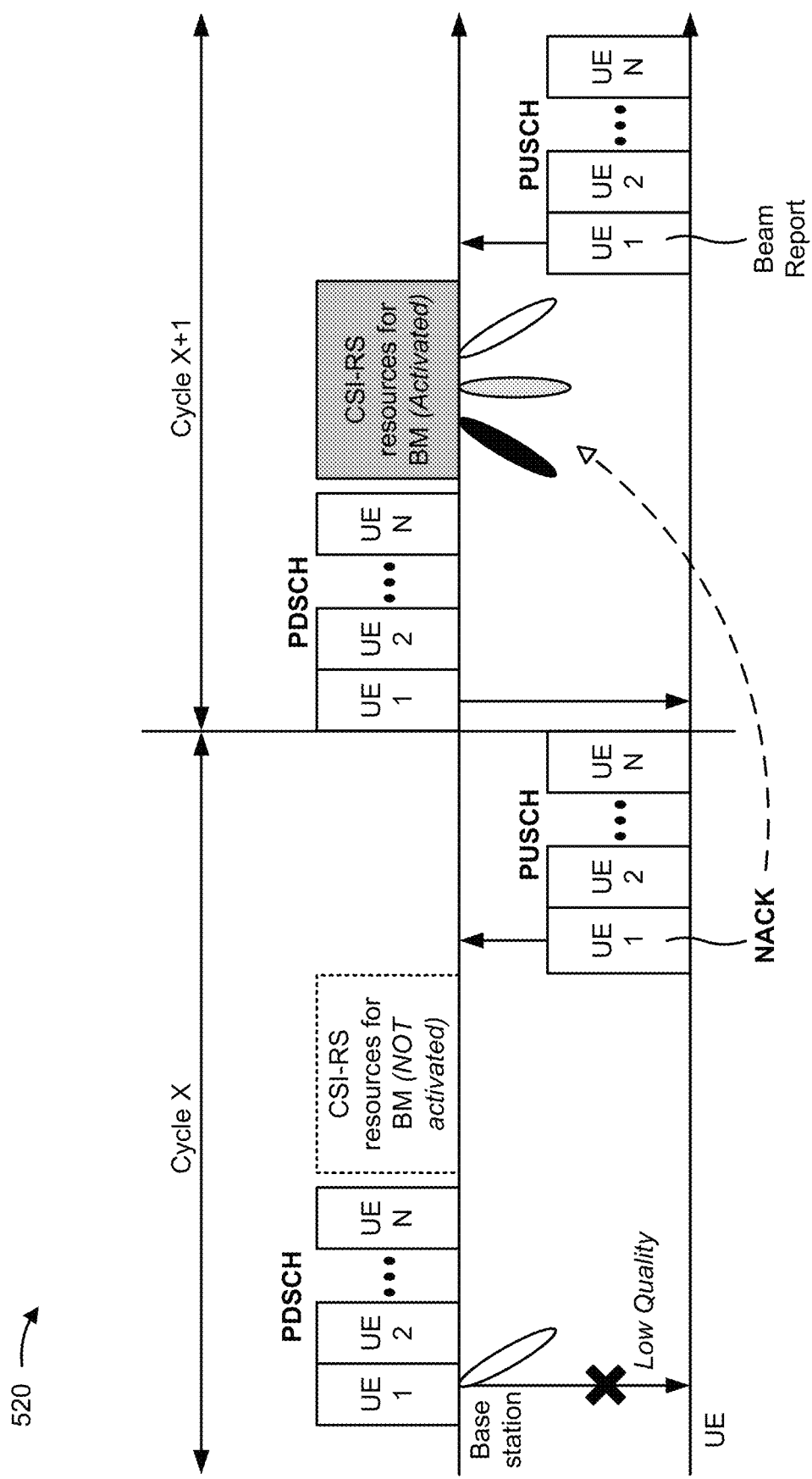
Figure 5C:
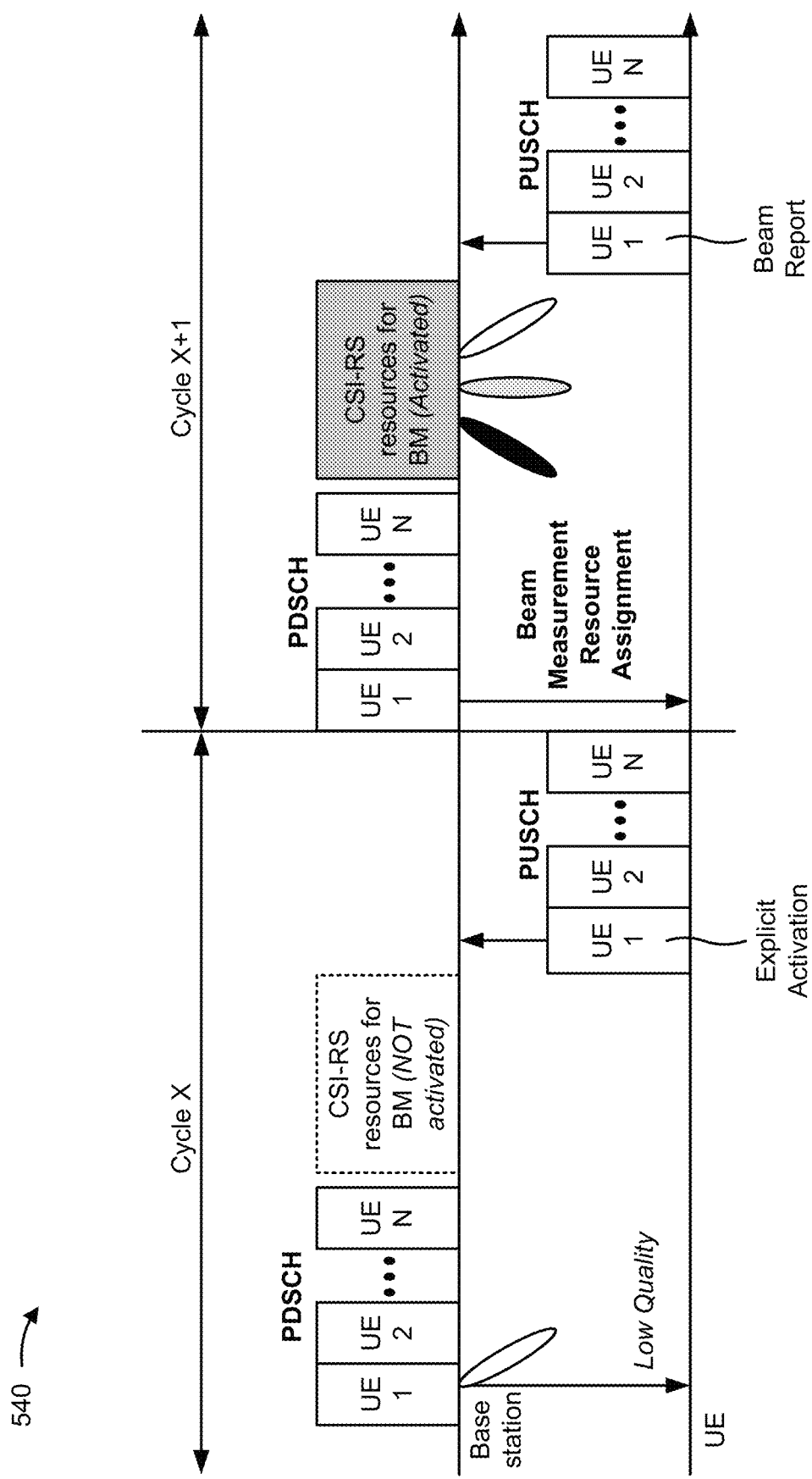

FIGS. 5A-5C are diagrams illustrating examples of UE based beam measurement resource activation, in accordance with various aspects of the present disclosure. As described in the examples below, in some aspects, a UE (e.g., UE 120) may determine that beam measurement resources associated with performing beam management are to be activated, and may transmit an activation signal associated with requesting activation of the beam measurement resources. As further described in the below examples, in some aspects, a base station (e.g., base station 110) may receive the activation signal transmitted by the UE, and may activate one or more of the beam measurement resources based at least in part on the activation signal.

FIG. 5A is a diagram illustrating an example 500 of UE based beam measurement resource activation using explicit signaling. As shown in FIG. 5A, in some aspects, a base station may transmit a downlink transmission (e.g., a PDSCH communication) to a particular UE (UE1) using a particular beam and in a particular set of downlink resources (e.g., a set of downlink resources assigned to UE1) during a first communication cycle (cycle X). As indicated in FIG. 5A, in example 500, UE1 may receive the downlink transmission, but a quality (e.g., an RSRP) of the beam used for the downlink transmission may be low (e.g., below a beam quality threshold). Notably, beam measurement resources (identified as a CSI-RS resources for beam measurement (BM)) are not activated during cycle X (e.g., such that the base station does not transmit CSI-RS in the beam measurement resources during cycle X).

In some aspects, as indicated by FIG. 5A, UE1 may determine that the beam measurement resources are to be activated, and may transmit an explicit indication to activate the beam measurement resources. In other words, in some aspects the UE may transmit an explicit activation signal associated with activating the beam measurement resources. As shown, in some aspects, UE1 may transmit the activation signal, including the explicit indication, in an uplink communication (e.g., a PUSCH communication) to the base station using a particular set of uplink resources (e.g., a set of uplink resources assigned to UE1) during cycle X.

In some aspects, UE1 may determine that the beam measurement resources are to be activated based at least in part on the quality of the beam used for reception of the downlink transmission. For example, UE1 may measure or otherwise determine the quality of the beam associated with receiving the downlink transmission (e.g., by measuring an RSRP of the beam). Here, if the quality of the beam fails to satisfy a beam quality threshold, then the UE may determine that the beam measurement resources are to be activated, and may transmit the activation signal, accordingly.

In some aspects, the activation signal may indicate a number of communication cycles during which the beam measurement resources are to be activated. For example, UE1 can determine (e.g., based at least in part on the beam quality, based at least in part on a configuration of UE1, and/or the like) a number of communication cycles during which the beam measurement resources are to be activated, and may include information indicating the number of communication cycles in the activation signal.

In some aspects, the beam measurement resources are pre-configured on the UE (e.g., time/frequency/beam per resource). In some aspects, the configuration of the beam measurement resources can be signaled to UE1 (e.g., by the base station) via semi-persistent scheduling (SPS), configured grant activation downlink control information (DCI), a radio resource control (RRC) configuration, and/or the like.

As further shown in FIG. 5A, in some aspects, the base station may receive the activation signal including the explicit indication, and may activate one or more of the beam measurement resources, accordingly. For example, the base station may receive the activation signal including the explicit indication and, during a second communication cycle (cycle X+1), may activate one or more of the beam measurement resources (e.g., such that the base station transmits CSI-RS in the one or more beam measurement resources during cycle X+1). As indicated in FIG. 5A, in some aspects, the beam measurement resources may be after (in time) a set of downlink resources assigned to UE1 and, therefore, the base station may activate the one or more beam measurement resources after transmitting another downlink transmission to UE1.

In some aspects, after transmitting the activation signal including the explicit indication, UE1 may measure one or more beams associated with the one or more beam measurement resources in association with performing beam management. As further shown in FIG. 5A, after performing beam management, the UE may transmit a beam report to the base station.

FIG. 5B is a diagram illustrating an example 520 of UE based beam measurement resource activation using implicit signaling. As shown in FIG. 5B, in some aspects, a base station may transmit a downlink transmission (e.g., a PDSCH communication) to UE1 using a particular beam and in a particular set of downlink resources (e.g., a set of downlink resources assigned to UE1) during cycle X. As indicated in FIG. 5B, in example 520, UE1 may fail to receive the downlink transmission (e.g., due to a low quality of the beam used for the downlink transmission). Notably, beam measurement resources (identified as a CSI-RS resources for beam measurement (BM)) are not activated during cycle X.

In some aspects, as indicated by FIG. 5B, UE1 may determine that the beam measurement resources are to be activated. For example, UE1 may determine that the beam measurement resources are to be activated based at least in part on the failure to receive the downlink transmission. In general, UE1 may determine that the beam measurement resources are to be activated based at least in part on, for example, detecting an error associated with receiving the downlink transmission (e.g., failing to receive a downlink transmission), determining that an SINR associated with receiving the downlink transmission fails to satisfy an SINR threshold, determining that an RSRP of a beam to be used of receiving the downlink transmission fails to satisfy an RSRP threshold, detecting cell interference (e.g., an amount of cell interference that satisfies a threshold), detecting cross link interference (e.g., an amount of cross link interference that satisfies a threshold), or the like. In other words, UE1 may trigger activation of the beam management resources in a variety of scenarios in which potential blocking of the beam is detected by UE1.

In some aspects, based at least in part on determining that the beam measurement resources are to be activated, UE1 may transmit an implicit indication to activate the beam measurement resources. In other words, in some aspects the UE may transmit an implicit activation signal associated with activating the beam measurement resources. As shown, in some aspects, UE1 may transmit the activation signal, including the implicit indication, in an uplink communication (e.g., a PUSCH communication) to the base station using a particular set of uplink resources (e.g., a set of uplink resources assigned to UE1) during cycle X.

In some aspects, UE1 may determine that the beam measurement resources are to be activated based at least in part on a failure to receive the downlink transmission. In some aspects, UE1 may determine that the beam measurement resources are to be activated based at least in part on the quality of the beam used for reception of the downlink transmission, as described above.

In some aspects, the implicit indication may be a negative acknowledgment (NACK) of the downlink transmission. In other words, in some aspects, the UE may fail to receive the downlink transmission, and may transmit a NACK associated with the downlink transmission. Here, the NACK may serve as the implicit indication to activate one or more of the beam measurement resources.

In some aspects, the implicit indication may be a discontinuous transmission (DTX) by UE1. In other words, in some aspects, the UE may fail to receive the downlink transmission due to poor beam quality. Here, when transmitting a subsequent uplink transmission to the base station using the beam, the uplink transmission may be a DTX. Here, the DTX, as detected by the base station, may serve as the implicit indication to activate one or more of the beam measurement resources.

In some aspects, a number of communication cycles for which the beam measurement resources are activated (e.g., a next communication only, a plurality of upcoming communication cycles, and/or the like) based at least in part on an implicit indication can be dynamically configured or statically configured on UE1 and/or the base station (e.g., based at least in part on a governing wireless communication standard).

As further shown in FIG. 5B, in some aspects, the base station may receive the activation signal including the implicit indication, and may activate one or more of the beam measurement resources, accordingly. For example, the base station may receive the activation signal including the implicit indication and, during cycle X+1, may activate one or more of the beam measurement resources (e.g., such that the base station transmits CSI-RS in one or more of the beam measurement resources during cycle X+1). As indicated in FIG. 5B, in some aspects, the beam measurement resources may be after (in time) a set of downlink resources assigned to UE1 and, therefore, the base station may activate the one or more beam measurement resources after transmitting another downlink transmission to UE1.

In some aspects, the base station may expect to receive feedback associated with the downlink transmission in a particular set of resources (e.g., the base station may expect to receive an ACK or a NACK in a particular set of frequency/time resources). Here, when the base station receives a NACK in the particular set of resources, the NACK may serve as the activation signal. Similarly, when the base station does not receive feedback in the particular set of resources (e.g., when an ACK was transmitted by the UE but not received by the base stations, or when a NACK was transmitted by the UE but was not received by the base station), the lack of feedback may serve as the activation signal. In some aspects, the UE may be configured (e.g., based at least in part on an agreement with the base station during establishment of an RRC connection) to expect PDCCH beam sweeping to occur after the UE transmits a NACK. Here, beam management resources should be pre-configured on the UE to permit the UE to perform one or more measurements associated with performing beam management (e.g., since, per the agreement with the base station, the beam management resources should be activated based at least in part on the UE transmitting a NACK).

In some aspects, after transmitting the activation signal including the implicit indication, UE1 may measure one or more beams associated with the one or more beam measurement resources in association with performing beam management. As further shown in FIG. 5B, after performing beam management, the UE may transmit a beam report to the base station.

In this way, a UE (rather than a base station) may cause beam measurement resources to be activated for use in association with performing beam management, thereby reducing latency associated with activating the beam measurement resources.

In some aspects, assignment of particular sets of beam measurement resources may be utilized in order to resolve activation collision of beam measurement shared by multiple UEs. For example, multiple UEs (e.g., UE1 through UEN) may be configured with the same beam measurement resources. Here, in a given communication cycle, two or more of the UEs may transmit respective activation signals in any of the manners described above. Thus, it is possible that activation collision can occur (e.g., when two or more of the multiple UEs transmit activation signals associated with activating the shared beam measurement resources). In this case, assignment of particular sets of beam measurement resources may be utilized in order to resolve this activation collision.

FIG. 5C is a diagram illustrating an example 540 of assignment of beam measurement resources. As shown in FIG. 5C, UE1 may transmit, and the base station may receive, an activation signal associated with activating beam measurement resources. Notably, while an activation signal including an explicit indication is shown in FIG. 5C, the activation may alternatively include an implicit indication.

In some aspects, as shown in FIG. 5C, the base station may assign a particular set of beam measurement resources to UE1. For example, the base station may assign a particular set of beam measurement resources (e.g., a subset of the beam measurement resources) to UE1 based at least in part on the activation signal and, optionally, based at least in part on activation signals received from other UEs during the communication cycle. As further shown, the base station may transmit, to UE1, information that identifies the particular set of beam measurement resources assigned to UE1. Here, UE1 may receive the information that identifies the particular set of beam measurement resources, and may measure one or more beams associated with the particular set of measurement resources in association with performing beam management. As further shown in FIG. 5C, after performing beam management, UE1 may transmit a beam report to the base station.

In some aspects, the base station may perform the operations described in association with FIG. 5C in order to assign resources to multiple UEs (e.g., for each UE that transmitted an activation signal during cycle X). In some aspects, the base station may assign particular sets of beam measurement resources to the multiple UEs based at least in part on metrics associated with the multiple UEs. For example, in some aspects, a given UE may include a metric in the activation signal, where the metric is associated with determining a beam measurement priority of the UE. The metric may include, for example, a reference signal received power (RSRP), a signal plus interference to noise ratio (SINR), information that identifies a traffic class associated with UE traffic (e.g., delay sensitive, delay insensitive, and/or the like), a randomly selected value (e.g., where a smaller number indicates a higher beam measurement priority), and/or the like. Here, the base station may receive metrics from each of the multiple UEs, may determine beam measurement priorities associated with assigning particular sets of beam measurement resources to the multiple UEs, and may assign the particular sets of beam measurement resources accordingly (e.g., such that UEs with higher beam measurement priorities are assigned sets of beam measurement resources with preference over UEs with lower beam measurement priorities).

In some aspects, a UE may transmit a deactivation signal in association with requesting deactivation of the beam measurement resources. For example, UE1, after measuring one or more beams in association with performing beam management, may transmit a deactivation signal associated with deactivating the beam measurement resources. Here, the base station may receive the deactivation signal, and may deactivate the beam measurement resources accordingly (e.g., such that the base station does not transmit CSI-RS in the beam measurement resources during an upcoming communication cycle). Alternatively, in a scenario in which a particular set of beam measurement resources is assigned to UE1, when UE1 signals deactivation of the particular set of beam measurement resources, the base station may reassign the particular set of beam measurement resources to another UE (e.g., another UE that transmitted an activation signal but has not yet been assigned a particular set of beam measurement resources).

As indicated above, FIGS. 5A-5C are provided as examples. Other examples may differ from what is described with respect to FIGS. 5A-5C.

FIG. 6 is a diagram illustrating an example process 600 performed, for example, by a UE, in accordance with various aspects of the present disclosure. Example process 600 is an example where a UE (e.g., UE 120 and/or the like) performs operations associated with UE based beam measurement resource activation.

As shown in FIG. 6, in some aspects, process 600 may include determining that beam measurement resources, associated with performing beam management, are to be activated (block 610). For example, the UE (e.g., using receive processor 258, transmit processor 264, controller/processor 280, memory 282, and/or the like) may determine that beam measurement resources, associated with performing beam management, are to be activated, as described above, for example, with reference to FIGS. 5A-5C.

As further shown in FIG. 6, in some aspects, process 600 may include transmitting an activation signal associated with requesting activation of the beam measurement resources (block 620). For example, the UE (e.g., using controller/processor 280, transmit processor 264, TX MIMO processor 266, MOD 254, antenna 252, and/or the like) may transmit an activation signal associated with requesting activation of the beam measurement resources, as described above, for example, with reference to FIGS. 5A-5C.

Process 600 may include additional aspects, such as any single aspect or any combination of aspects described below and/or in connection with one or more other processes described elsewhere herein.

In a first aspect, the activation signal includes an explicit indication to activate the beam measurement resources.

In a second aspect, alone or in combination with the first aspect, the beam measurement resources are pre-configured on the UE.

In a third aspect, alone or in combination with one or more of the first and second aspects, a configuration of the beam measurement resources is signaled via at least one of: semi-persistent scheduling (SPS), configured grant activation downlink control information (DCI), or a radio resource control (RRC) configuration.

In a fourth aspect, alone or in combination with one or more of the first through third aspects, the determination that the beam measurement resources are to be activated is based at least in part on a quality of a beam used for reception of a downlink transmission.

In a fifth aspect, alone or in combination with one or more of the first through fourth aspects, the activation signal indicates a number of communication cycles during which the beam measurement resources are to be activated.

In a sixth aspect, alone or in combination with one or more of the first through fifth aspects, the activation signal includes an implicit indication to activate the beam measurement resources.

In a seventh aspect, alone or in combination with one or more of the first through sixth aspects, the implicit indication is a negative acknowledgment (NACK) of a downlink transmission.

In an eighth aspect, alone or in combination with one or more of the first through seventh aspects, the implicit indication is a discontinuous transmission (DTX) by the UE.

In a ninth aspect, alone or in combination with one or more of the first through eighth aspects, the determination that the beam measurement resources are to be activated is based at least in part on a failure to receive a downlink transmission.

In a tenth aspect, alone or in combination with one or more of the first through ninth aspects, information that identifies a particular set of beam measurement resources, of the beam measurement resources, is received after the activation signal is transmitted, the particular set of beam measurement resources being assigned to the UE.

In an eleventh aspect, alone or in combination with one or more of the first through tenth aspects, after the activation signal is transmitted, a deactivation signal is transmitted in association with requesting deactivation of the beam measurement resources.

In a twelfth aspect, alone or in combination with one or more of the first through eleventh aspects, the activation signal includes a metric associated with determining a beam measurement priority of the UE.

In a thirteenth aspect, alone or in combination with one or more of the first through twelfth aspects, the metric includes at least one of: a reference signal received power (RSRP), a signal plus interference to noise ratio (SINR), information that identifies a traffic class, or a randomly selected value.

In a fourteenth aspect, alone or in combination with one or more of the first through thirteenth aspects, the determination that the beam measurement resources are to be activated is based at least in part on at least one of: detecting an error associated with receiving a downlink transmission, determining that an SINR associated with receiving the downlink transmission fails to satisfy an SINR threshold, determining that an RSRP of a beam to be used for receiving the downlink transmission fails to satisfy an RSRP threshold, detecting cell interference, or detecting cross link interference.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a base station, in accordance with various aspects of the present disclosure. Example process 700 is an example where a base station (e.g., base station 110 and/or the like) performs operations associated with UE based beam measurement resource activation.

As shown in FIG. 7, in some aspects, process 700 may include receiving an activation signal associated with requesting activation of beam measurement resources associated with performing beam management, wherein the activation signal is transmitted by a UE (block 710). For example, the base station (e.g., using antenna 234, DEMOD 232, MIMO detector 236, receive processor 238, controller/processor 240, and/or the like) may receive an activation signal associated with requesting activation of beam measurement resources associated with performing beam management, wherein the activation signal is transmitted by a UE (e.g., UE 120), as described above, for example, with reference to FIGS. 5A-5C. In some aspects, the activation signal is transmitted by a UE.

As further shown in FIG. 7, in some aspects, process 700 may include activating one or more of the beam management resources based at least in part on the activation signal (block 720). For example, the base station (e.g., using controller/processor 240, transmit processor 220, TX MIMO processor 230, MOD 232, antenna 234, and/or the like) may activate one or more of the beam management resources based at least in part on the activation signal, as described above, for example, with reference to FIGS. 5A-5C.

Process 700 may include additional aspects, such as any single aspect or any combination of aspects described below and/or in connection with one or more other processes described elsewhere herein.

In a first aspect, the activation signal includes an explicit indication to activate the beam measurement resources.

In a second aspect, alone or in combination with the first aspect, the beam measurement resources are pre-configured on the UE.

In a third aspect, alone or in combination with one or more of the first and second aspects, a configuration of the beam measurement resources is signaled via at least one of: SPS, configured grant activation DCI, or an RRC configuration.

In a fourth aspect, alone or in combination with one or more of the first through third aspects, the activation signal indicates a number of communication cycles during which the beam measurement resources are to be activated.

In a fifth aspect, alone or in combination with one or more of the first through fourth aspects, the activation signal includes an implicit indication to activate the beam measurement resources.

In a sixth aspect, alone or in combination with one or more of the first through fifth aspects, the implicit indication is a NACK of a downlink transmission.

In a seventh aspect, alone or in combination with one or more of the first through sixth aspects, the implicit indication is a DTX by the UE.

In an eighth aspect, alone or in combination with one or more of the first through seventh aspects, the base station assigns a particular set of beam measurement resources to the UE based at least in part on the activation signal, and transmits information that identifies the particular set of beam measurement resources to the UE.

In a ninth aspect, alone or in combination with one or more of the first through eighth aspects, after the activation signal is received, a deactivation signal is received in association with requesting deactivation of the beam measurement resources.

In a tenth aspect, alone or in combination with one or more of the first through ninth aspects, the activation signal includes a metric associated with determining a beam measurement priority of the UE.

In an eleventh aspect, alone or in combination with one or more of the first through tenth aspects, the metric includes at least one of: an RSRP, an SINR, information that identifies a traffic class, or a randomly selected value.

In a twelfth aspect, alone or in combination with one or more of the first through eleventh aspects, a determination that the beam measurement resources are to be activated is based at least in part on at least one of: an error associated with a downlink transmission, an SINR associated with the downlink transmission failing to satisfy an SINR threshold, an RSRP of a beam to be used for receiving the downlink transmission failing to satisfy an RSRP threshold, a detection of cell interference, or a detection of cross link interference.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that beam measurement resources, associated with performing beam management, are to be activated; and
   transmitting an activation signal associated with requesting activation of the beam measurement resources, wherein the activation signal indicates a number of communication cycles during which the beam measurement resources are to be activated.

2. The method of claim 1, wherein the activation signal includes an explicit indication to activate the beam measurement resources.

3. The method of claim 1, wherein the beam measurement resources are pre-configured on the UE.

4. The method of claim 1, wherein a configuration of the beam measurement resources is signaled via at least one of:
   semi-persistent scheduling (SPS);
   configured grant activation downlink control information (DCI); or
   a radio resource control (RRC) configuration.

5. The method of claim 1, wherein the determination that the beam measurement resources are to be activated is based at least in part on at least one of:
   detecting an error associated with receiving a downlink transmission,
   determining that a signal-to-interference-plus-noise ratio (SINR) associated with receiving the downlink transmission fails to satisfy an SINR threshold,
   determining that a reference signal received power (RSRP) of a beam to be used for receiving the downlink transmission fails to satisfy an RSRP threshold,
   detecting cell interference, or
   detecting cross link interference.

6. The method of claim 1, wherein the activation signal includes an implicit indication to activate the beam measurement resources.

7. The method of claim 6, wherein the implicit indication is a negative acknowledgment (NACK) of a downlink transmission.

8. The method of claim 6, wherein the implicit indication is a discontinuous transmission (DTX) by the UE.

9. The method of claim 1, wherein information that identifies a particular set of beam measurement resources, of the beam measurement resources, is received after the activation signal is transmitted, the particular set of beam measurement resources being assigned to the UE.

10. The method of claim 1, wherein, after the activation signal is transmitted, a deactivation signal is transmitted in association with requesting deactivation of the beam measurement resources.

11. The method of claim 1, wherein the activation signal includes a metric associated with determining a beam measurement priority of the UE.

12. The method of claim 11, wherein the metric includes at least one of:
   a reference signal received power (RSRP);
   a signal plus interference to noise ratio (SINR);
   information that identifies a traffic class; or
   a randomly selected value.

13. A method of wireless communication performed by a base station, comprising:
   receiving an activation signal associated with requesting activation of beam measurement resources associated with performing beam management,
      wherein the activation signal is transmitted by a user equipment (UE), and
      wherein the activation signal indicates a number of communication cycles during which the beam measurement resources are to be activated; and
   activating one or more of the beam management resources based at least in part on the activation signal.

14. The method of claim 13, wherein the activation signal includes an explicit indication to activate the beam measurement resources.

15. The method of claim 13, wherein the beam measurement resources are pre-configured on the UE.

16. The method of claim 13, wherein a configuration of the beam measurement resources is signaled via at least one of:
   semi-persistent scheduling (SPS);
   configured grant activation downlink control information (DCI); or
   a radio resource control (RRC) configuration.

17. The method of claim 13, wherein the activation signal includes an implicit indication to activate the beam measurement resources.

18. The method of claim 17, wherein the implicit indication is a negative acknowledgment (NACK) of a downlink transmission.

19. The method of claim 17, wherein the implicit indication is a discontinuous transmission (DTX) by the UE.

20. The method of claim 13, further comprising:
   assigning a particular set of beam measurement resources to the UE based at least in part on the activation signal; and
   transmitting information that identifies the particular set of beam measurement resources to the UE.

21. The method of claim 13, wherein, after the activation signal is received, a deactivation signal is received in association with requesting deactivation of the beam measurement resources.

22. The method of claim 13, wherein the activation signal includes a metric associated with determining a beam measurement priority of the UE.

23. The method of claim 22, wherein the metric includes at least one of:
   a reference signal received power (RSRP);
   a signal plus interference to noise ratio (SINR);
   information that identifies a traffic class; or
   a randomly selected value.

24. The method of claim 23, wherein a determination that the beam measurement resources are to be activated is based at least in part on at least one of:
   an error associated with a downlink transmission,
   a signal-to-interference-plus-noise ratio (SINR) associated with the downlink transmission failing to satisfy an SINR threshold, a reference signal received power (RSRP) of a beam to be used for receiving the downlink transmission failing to satisfy an RSRP threshold, a detection of cell interference, or a detection of cross link interference.

25. A user equipment (UE) for wireless communication, comprising:

a memory; and one or more processors operatively coupled to the memory, the memory and the one or more processors configured to:

determine that beam measurement resources, associated with performing beam management, are to be activated; and transmit an activation signal associated with requesting activation of the beam measurement resources, wherein the activation signal indicates a number of communication cycles during which the beam measurement resources are to be activated.

26. The UE of claim 25, wherein the determination that the beam measurement resources are to be activated is based at least in part on at least one of:

detecting an error associated with receiving a downlink transmission, determining that a signal-to-interference-plus-noise ratio (SINR) associated with receiving the downlink transmission fails to satisfy an SINR threshold, determining that a reference signal received power (RSRP) of a beam to be used for receiving the downlink transmission fails to satisfy an RSRP threshold, detecting cell interference, or detecting cross link interference.

27. A base station for wireless communication, comprising:

a memory; and one or more processors operatively coupled to the memory, the memory and the one or more processors configured to:

receive an activation signal associated with requesting activation of beam measurement resources associated with performing beam management, wherein the activation signal is transmitted by a user equipment (UE), and wherein the activation signal indicates a number of communication cycles during which the beam measurement resources are to be activated; and activate one or more of the beam management resources based at least in part on the activation signal.

28. The base station of claim 27, wherein a determination that the beam measurement resources are to be activated is based at least in part on at least one of:

an error associated with a downlink transmission, a signal-to-interference-plus-noise ratio (SINR) associated with the downlink transmission failing to satisfy an SINR threshold, a reference signal received power (RSRP) of a beam to be used for receiving the downlink transmission failing to satisfy an RSRP threshold, a detection of cell interference, or a detection of cross link interference.

29. The base station of claim 27, wherein a configuration of the beam measurement resources is signaled via at least one of:

configured grant activation downlink control information (DCI); or a radio resource control (RRC) configuration.

30. The UE of claim 25, wherein a configuration of the beam measurement resources is signaled via at least one of:

configured grant activation downlink control information (DCI); or a radio resource control (RRC) configuration.

* * * * *